US009088803B2

United States Patent
Li et al.

(10) Patent No.: US 9,088,803 B2
(45) Date of Patent: Jul. 21, 2015

(54) SOFTWARE DEFINED JOINT BANDWIDTH PROVISIONING AND CACHE MANAGEMENT FOR MBH VIDEO TRAFFIC OPTIMIZATION

(71) Applicant: NEC Laboratories America, Inc., Princeton, NJ (US)

(72) Inventors: Xu Li, Plainsboro, NJ (US); Konstantinos Kanonakis, New Brunswick, NJ (US); Neda Cvijetic, Plainsboro, NJ (US); Akihoro Tanaka, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/513,164

(22) Filed: Oct. 13, 2014

(65) Prior Publication Data

US 2015/0106864 A1  Apr. 16, 2015

Related U.S. Application Data

(60) Provisional application No. 61/890,442, filed on Oct. 14, 2013.

(51) Int. Cl.
| | |
|---|---|
| *H04N 7/173* | (2011.01) |
| *H04N 7/16* | (2011.01) |
| *H04N 21/231* | (2011.01) |
| *H04B 10/2575* | (2013.01) |
| *H04N 21/222* | (2011.01) |
| *H04N 21/239* | (2011.01) |
| *H04N 21/238* | (2011.01) |
| *H04N 21/414* | (2011.01) |
| *H04N 21/63* | (2011.01) |

(Continued)

(52) U.S. Cl.
CPC ... *H04N 21/23106* (2013.01); *H04B 10/25751* (2013.01); *H04N 21/222* (2013.01); *H04N 21/238* (2013.01); *H04N 21/2393* (2013.01); *H04N 21/23113* (2013.01); *H04N 21/41407* (2013.01); *H04N 21/632* (2013.01); *H04N 21/6338* (2013.01); *H04N 21/64738* (2013.01)

(58) Field of Classification Search
None
See application file for complete search history.

(56) References Cited

U.S. PATENT DOCUMENTS

| 8,432,808 B1 * | 4/2013 | Dankberg et al. | 370/235 |
|---|---|---|---|
| 2003/0055910 A1 * | 3/2003 | Amini et al. | 709/214 |
| 2006/0085553 A1 * | 4/2006 | Rachwalski et al. | 709/233 |

(Continued)

OTHER PUBLICATIONS

O. Tipmongkolsilp, "The Evolution of Cellular Backhaul Technologies: Current Issues and Future Trends," in IEEE Comm. Survey and Tutorial, 2011.

(Continued)

*Primary Examiner* — Nathan Flynn
*Assistant Examiner* — William J Kim
(74) *Attorney, Agent, or Firm* — Joseph Kolodka

(57) ABSTRACT

A method includes provisioning joint bandwidth in a software defined passive optical network PON based mobile backhaul MBH and cache management on base stations for video delivery across the network, the provisioning in each time unit includes grouping bandwidth utilization in the network into a first category used to support video requests which cannot directly be served by caches on base stations, the first category video requests being high priority, and if bandwidth remains after the high priority requests remaining bandwidth being used to deliver some videos that are low priority to caches.

8 Claims, 3 Drawing Sheets

(51) Int. Cl.
*H04N 21/6338* (2011.01)
*H04N 21/647* (2011.01)

(56) References Cited

U.S. PATENT DOCUMENTS

| | | | |
|---|---|---|---|
| 2008/0305834 A1* | 12/2008 | Janiszewski et al. | 455/561 |
| 2010/0085947 A1* | 4/2010 | Ringland et al. | 370/338 |
| 2011/0202634 A1* | 8/2011 | Kovvali et al. | 709/219 |
| 2011/0271007 A1* | 11/2011 | Wang et al. | 709/238 |
| 2011/0317585 A1* | 12/2011 | Moon et al. | 370/254 |
| 2012/0239811 A1* | 9/2012 | Kohli et al. | 709/226 |
| 2012/0259994 A1* | 10/2012 | Gillies et al. | 709/231 |
| 2012/0311062 A1* | 12/2012 | Frydman et al. | 709/212 |
| 2013/0042071 A1* | 2/2013 | Chetlur et al. | 711/130 |
| 2013/0054729 A1* | 2/2013 | Jaiswal et al. | 709/213 |
| 2013/0097309 A1* | 4/2013 | Ma et al. | 709/224 |
| 2013/0290465 A1* | 10/2013 | Harrison et al. | 709/213 |
| 2015/0003234 A1* | 1/2015 | Samardzija et al. | 370/229 |

OTHER PUBLICATIONS

N. Cvijetic, "OFDM for Next Generation Optical Access Networks," in IEEE JLT, 2012.

K. Kanonakis, "Dynamic Software-Defined Resource Optimization in Next-Generation Optical Access Enabled by OFDMA-Based Meta-MAC Provisioning," in IEEE JLT, 2013.

N. Golrezaei, "FemtoCaching: Wireless Video Content Delivery through Distributed Caching Helpers," in IEEE INFOCOM, 2012.

* cited by examiner

SOFTWARE DEFINED JOINT BANDWIDTH PROVISIONING AND CACHE MANAGEMENT FOR MBH VIDEO TRAFFIC OPTIMIZATION

RELATED APPLICATION INFORMATION

This application claims priority to provisional application No. 61/890,442 filed Oct. 14, 2013, the contents thereof are incorporated herein by reference.

BACKGROUND OF THE INVENTION

The present invention relates generally to optical communications, and more particularly, to software defined joint bandwidth provisioning and cache management for mobile backhaul (MBH) video traffic optimization.

The following references are mentioned or referred to herein:

[1] O. Tipmongkolsilp, "The Evolution of Cellular Backhaul Technologies: Current Issues and Future Trends," in *IEEE Comm. Survey and Tutorial*, 2011.
[2] N. Cvijetic, "OFDM for Next Generation Optical Access Networks," in *IEEE JLT*, 2012.
[3] K. Kanonakis, "Dynamic Software-Defined Resource Optimization in Next-Generation Optical Access Enabled by OFDMA-Based Meta-MAC Provisioning," in *IEEE JLT*, 2013.
[4] N. Golrezaei, "FemtoCaching: Wireless Video Content Delivery through Distributed Caching Helpers," in *IEEE INFOCOM*, 2012.

Due to the popularity of various high-performance personal devices (e.g., smart phones, pads, tablets, etc.), mobile network operators and carriers are experiencing difficulty in meeting sharp-increasing traffic demands induced by many bandwidth-consuming applications, e.g., high-definition (HD) video streaming services (as considered in this paper), etc. In particular, the expenditure on upgrading mobile backhaul (MBH) capacity in fact accounts for a significant amount of OPEX diluting the profit (e.g. the prohibitive rental costs of E1/T1 lines).

On one hand, in the data transmission area, a number of MBH solutions have been investigated to replace the traditional E1/T1 cooper lines, including satellite-based, microwave-based, optical-based (e.g., using Passive Optical Networks (PON) as studied in this paper), etc. [1]. On the other hand, in the data storage/caching area, an alternative approach to reducing MBH traffic is to deploy distributed caches within the network. In particular, recent research efforts from both academia and industry have advocated deploying caches as close to the end users as possible (e.g., directly installing caches on base stations (BSs) as studied in [4]).

Accordingly, there is a need for an effective solution joint bandwidth provisioning in software-defined PON-based MBH and cache management on base stations for HQ video delivery and designed an effective solution.

BRIEF SUMMARY OF THE INVENTION

The present invention is directed to a method that includes provisioning joint bandwidth in a software defined passive optical network PON based mobile backhaul and cache management on base stations for video delivery across the network, the provisioning in each time unit includes grouping bandwidth utilization in the network into a first category used to support video requests which cannot directly be served by caches on base stations, the first category video requests being high priority, and if bandwidth remains after the high priority requests remaining bandwidth being used to deliver some videos that are low priority to caches.

In an alternative embodiment of the invention, a non-transitory storage medium configured with instructions for a computer to carry out implementing by a computer provisioning joint bandwidth in a software defined passive optical network PON based mobile backhaul and cache management on base stations for video delivery across the network, the provisioning in each time unit includes grouping bandwidth utilization in the network into a first category used to support video requests which cannot directly be served by caches on base stations, the first category video requests being high priority, and if bandwidth remains after the high priority requests remaining bandwidth being used to deliver some videos that are low priority to caches These and other advantages of the invention will be apparent to those of ordinary skill in the art by reference to the following detailed description and the accompanying drawings.

DETAILED DESCRIPTION

We take (but not limited to) OFDMA-PON as a case study, in which the whole bandwidth is defined as a set of subcarriers based on Meta-MAC concept [2][3]. For a given a number of video requests from mobile users associated with different BSs, a limited cache space on each of BSs, our major technical issues are to decide which videos are to be delivered, how bandwidth should be allocated in each time unit of a given time period, and the cache management (e.g. whether to cache a video for a given BS, which video should be deleted if the cache space is exhausted), such that the number of the served requests can be maximized. We propose a sophisticated heuristic and perform simulations to demonstrate the benefit of such a new joint optimization scheme for optimizing MBH video traffic and capacity.

The present invention is directed to a solution where in each time unit, the bandwidth utilization is grouped into two categories: Category-1 is used to support video requests which cannot be directly served by the caches on BSs (high priority). Besides the resources consumption in Category 1, if there is still remaining bandwidth, it will be utilized to deliver some videos to caches (low priority).

Our inventiveness comes from the fact that no existing work has jointly considered the MBH data transport issue (i.e., bandwidth provisioning as focused in this paper) and the cache management issue (in terms of video files storing/deleting) while in fact those two issues are highly related and can collaborate to achieve so called "two-dimensional data sharing benefit" for reducing MBH traffic.

Figure 1:
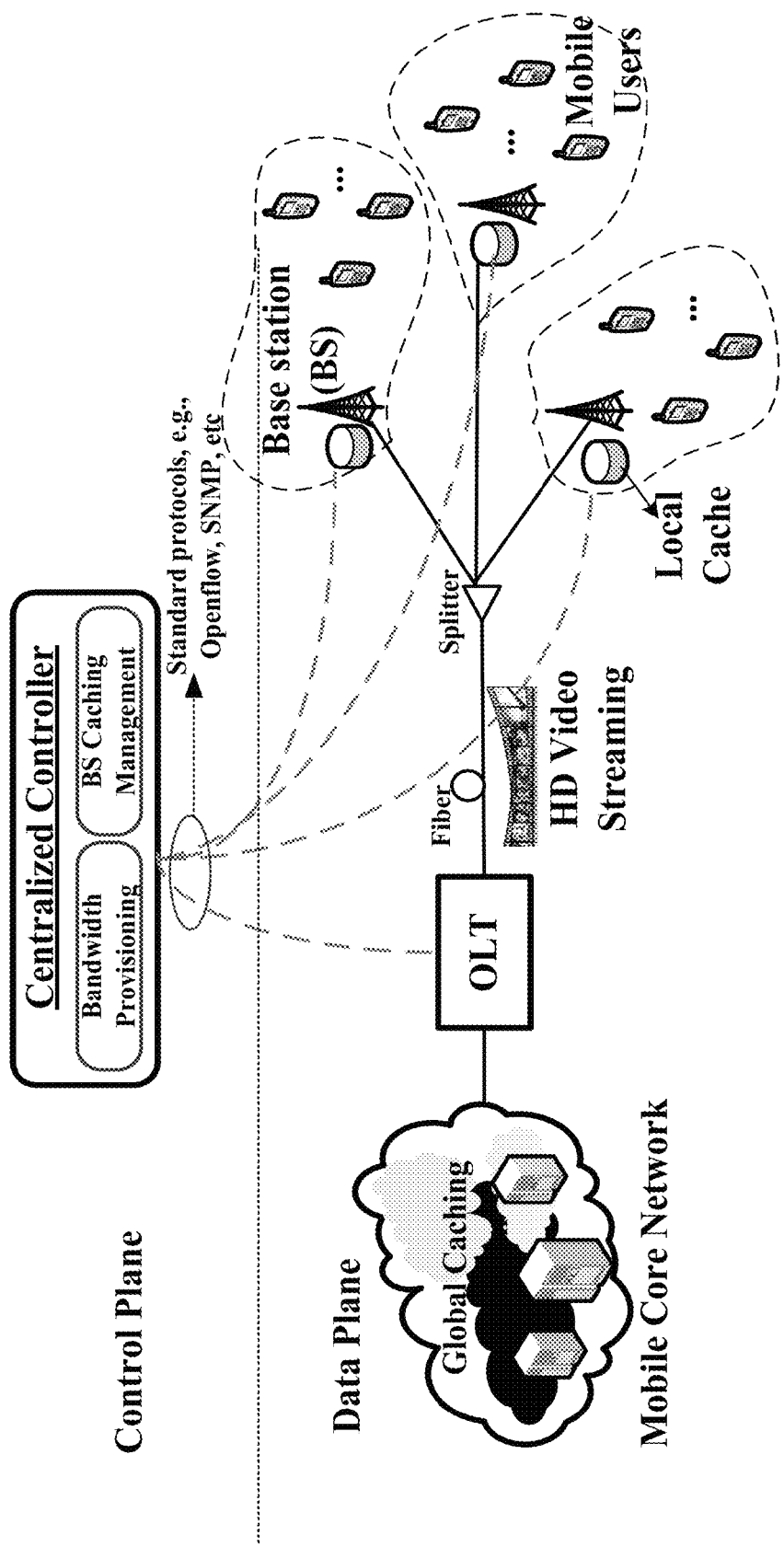
FIG. 1 is a diagram of a logic architecture of software defined passive optical network (PON) based mobile backhaul (MBH) with video caching.

Referring to FIG. 1, there is a shown an architecture of a software defined PON based MBH with video caching. At a data plane, a global caching system of a mobile core network is coupled to an optical line terminal the sends high definition HD video streaming via a splitter to a base station, mobile user and a local cache. At the control plane, a centralized controller controls bandwidth provisioning and base station caching management of the OLT, base station, mobile users and local cache.

Figure 2:
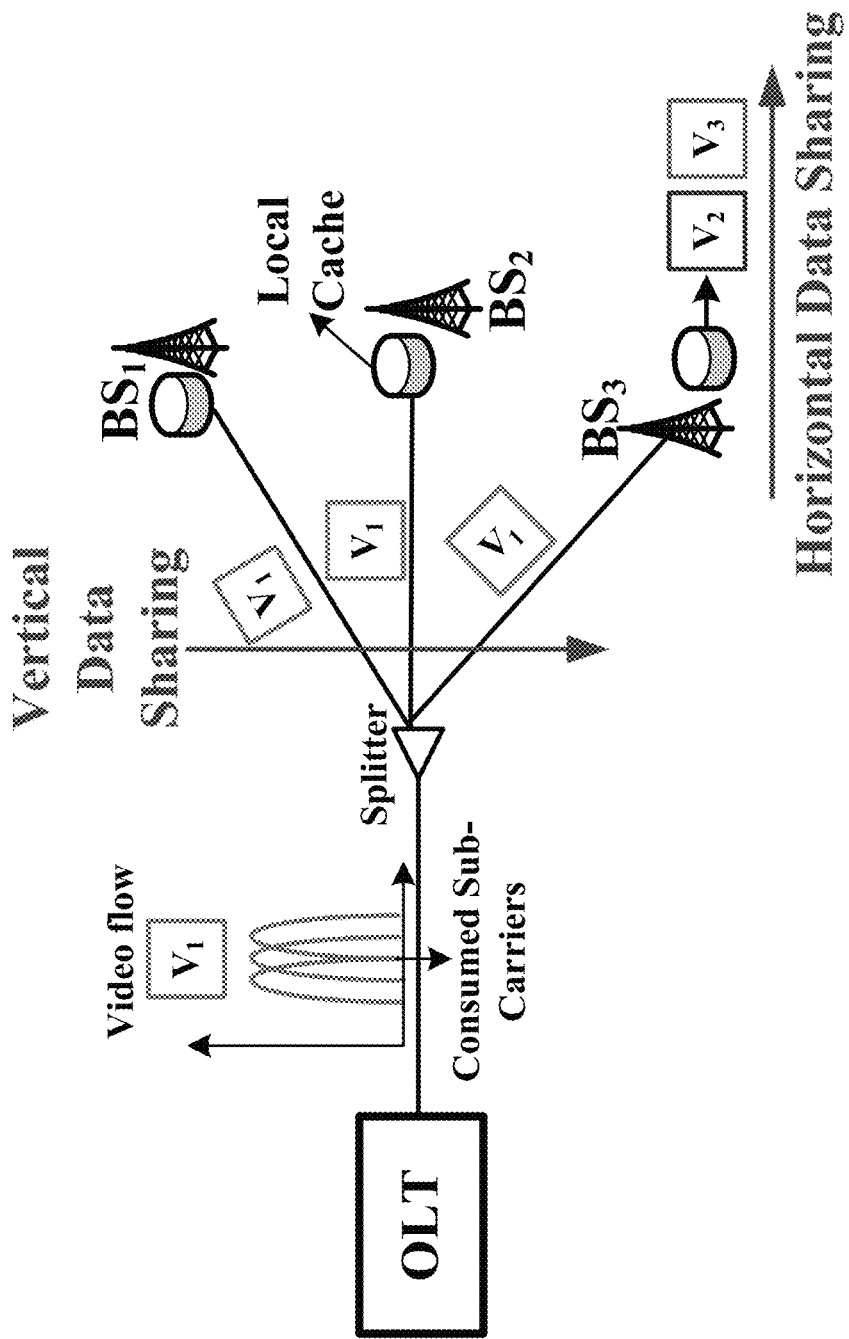
FIG. 2 is shows two-dimensional data sharing.

The diagram of FIG. 2 illustrates data sharing. The consumed video flow $V_1$ from the optical line terminal OLT is sent to the splitter and that data $V_1$ is vertically shared with a base station $BS_1$, local base station $BS_2$ and base station $BS_3$. The horizontal data sharing is illustrated with video flows $V_2$ and $V_3$ shared horizontally with $BS_3$.

Figure 3:
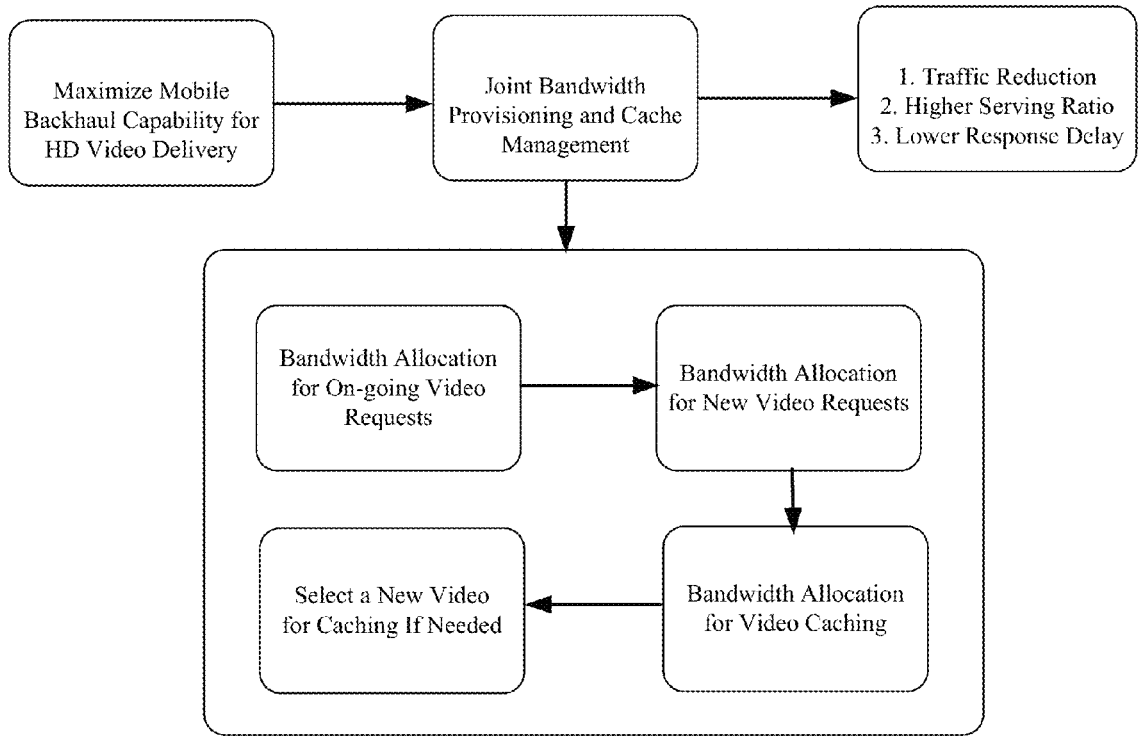
FIG. 3 is a block diagram of key aspects of the invention.

The diagram of FIG. 3 shows key aspects of the invention. The maximization of mobile backhaul capability for HD video delivery is archived with joint bandwidth provisioning and cache management to simultaneously control traffic reduction, higher serving ratio and lower response delay. The joint bandwidth provisioning and cache management provides for bandwidth allocation for on-going video requests, followed by bandwidth allocation for new video requests, followed by bandwidth allocation for video caching and selecting a new video for caching if needed.

In particular, on one hand, in an PON-based MBH network (FIG. 1), which includes a number of BSs connecting to an optical line terminal (OLT) (which can serve any request targeted for any videos from its global cache system), the same video could be multicasted from the OLT side to multiple BSs for serving a group of service requests by just using a same portion of bandwidth (e.g., sub-carriers in the context of OFDMA-PON) since the data transmissions in PON is broadcast in nature (which we called a vertical data sharing, e.g., video $v_1$ in FIG. 1.

On the other hand, assuming caches are available on the BSs, a video can be cached on BS for some time so that the later requests for the same video can be directly served by caches (which we called a horizontal data sharing, e.g., videos $v_2$ and $v_3$ in FIG. 2. In the meantime, with the horizontal data sharing, a "push"-based video delivery scheme can also be supported in the sense that videos can be delivered to BSs in advance (e.g., when MBH is not congested), compared to the pull-based video delivery scheme as adopted in most of existing applications. It is worth noting that software-defined networks (SDN) is a enabled technology for supporting the above idea because a controller is necessary to conduct joint bandwidth provisioning and caching management in a centralized manner, which for example can sit in the OLT and communicate with BSs through an out-of-band TCP/Ethernet.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 4:
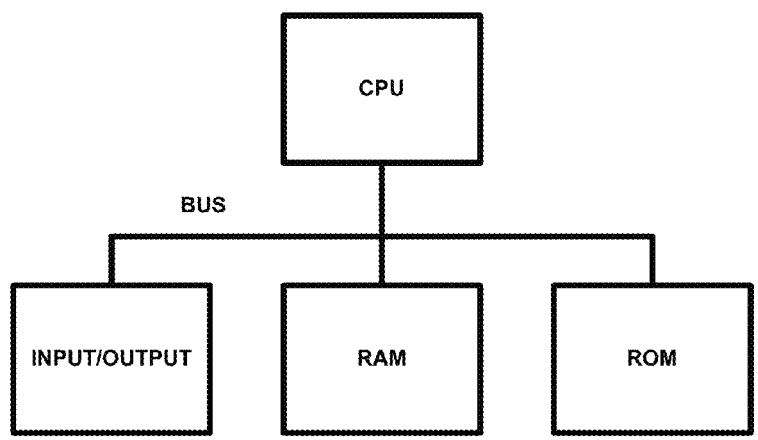
FIG. 4 shows an exemplary computer configuration to perform the invention.

By way of example, a block diagram of a computer to support the system is discussed next in FIG. 4. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can be appreciated that the invention can serve more video requests in terms of high request serving ratio and also have less service response delay, compared to the other native/existing solutions.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
providing joint bandwidth provisioning and cache management functions that maximize the number of served video delivery requests per unit time in a software defined passive optical network (PON) based mobile backhaul network comprising distributed base stations and a centralized optical line terminal (OLT) for video delivery across the network, the method further comprising:
grouping incoming video delivery requests arriving into the network within a given unit of time into a first category comprising video requests that have high priority but cannot directly be served by caches on base stations due to a lack of base station cache resources, and a second category comprising video requests that have low priority and are served only if excess bandwidth remains after bandwidth has been provisioned for the high priority requests from the first category;
provisioning bandwidth resources for high-priority video delivery requests from the first category by using bandwidth resources from the optical line terminal (OLT) of the PON to deliver the video to the base stations for delivery to end users;
provisioning bandwidth resources for low-priority video delivery requests if bandwidth remains after high-priority video requests from the first category have been served;

deleting base station caches using a popularity metric, wherein cached videos that are not popular are deleted to store more popular video delivery requests;

wherein the joint bandwidth provisioning and cache management provides for bandwidth allocation for high priority on-going video requests, followed by bandwidth allocation for new video requests, followed by bandwidth allocation for low priority video caching and selecting a new video for caching if needed.

2. The method of claim 1, wherein the bandwidth to be provisioned is defined as a set of sub-carriers.

3. The method of claim 2, wherein the provisioning comprises deciding which videos are to be delivered and how bandwidth should be allocated in each time unit of a given time period for a given number of video requests from mobile users associated with different base stations BSs, a limited cache space on each of the base stations BSs.

4. The method of claim 3, wherein the provisioning comprises cache management which includes whether to cache a video for a given base station BS, which video should be deleted if the cache space is exhausted, such that the number of the served requests can be maximized.

5. A non-transitory storage medium configured with instructions for a computer to carry out the following steps:

provisioning joint bandwidth in a software defined passive optical network PON based mobile backhaul and cache management on base stations for video delivery across the network, the provisioning in each time unit comprising:

grouping bandwidth utilization in the network into a first category used to support video requests which cannot directly be served by caches on base stations, the first category video requests being high priority, and if bandwidth remains after the high priority requests remaining bandwidth being used to deliver some videos that are low priority to caches, providing joint bandwidth provisioning and cache management functions that maximize the number of served video delivery requests per unit time in a software defined passive optical network (PON) based mobile backhaul network comprising distributed base stations and a centralized optical line terminal (OLT) for video delivery across the network, the method further comprising:

grouping incoming video delivery requests arriving into the network within a given unit of time into a first category comprising video requests that have high priority but cannot directly be served by caches on base stations due to a lack of base station cache resources, and a second category comprising video requests that have low priority and are served only if excess bandwidth remains after bandwidth has been provisioned for the high priority requests from the first category;

provisioning bandwidth resources for high-priority video delivery requests from the first category by using bandwidth resources from the optical line terminal (OLT) of the PON to deliver the video to the base stations for delivery to end users;

provisioning bandwidth resources for low-priority video delivery requests if bandwidth remains after high-priority video requests from the first category have been served;

deleting base station caches using a popularity metric, wherein cached videos that are not popular are deleted to store more popular video delivery requests;

wherein the joint bandwidth provisioning and cache management provides for bandwidth allocation for high priority on-going video requests, followed by bandwidth allocation for new video requests, followed by bandwidth allocation for low priority video caching and selecting a new video for caching if needed.

6. The medium of claim 5, wherein the bandwidth to be provisioned is defined as a set of sub-carriers.

7. The medium of claim 6, wherein the provisioning comprises deciding which videos are to be delivered and how bandwidth should be allocated in each time unit of a given time period for a given number of video requests from mobile users associated with different base stations BSs, a limited cache space on each of the base stations BSs.

8. The medium of claim 6, wherein the provisioning comprises cache management which includes whether to cache a video for a given base station BS, which video should be deleted if the cache space is exhausted, such that the number of the served requests can be maximized.

* * * * *